United States Patent [19]

Hayden

[11] 4,273,086
[45] Jun. 16, 1981

[54] DEVICE AND METHOD FOR FREEING FROZEN ENGINE CYLINDERS

[76] Inventor: Robert K. Hayden, Box 488, LaPlata, Md. 20646

[21] Appl. No.: 33,754

[22] Filed: Jun. 12, 1979

[51] Int. Cl.³ .................... F02B 77/00; F02B 75/12
[52] U.S. Cl. .......................... 123/198 R; 123/1 R; 134/20; 134/23; 134/30
[58] Field of Search ............. 123/1 R, 198 A, 198 R; 134/20, 23, 30

[56] References Cited

U.S. PATENT DOCUMENTS

| | | | |
|---|---|---|---|
| 1,538,904 | 5/1925 | Osterhout | 123/198 A |
| 2,229,063 | 1/1941 | Field | 123/196 M |
| 3,797,507 | 3/1974 | Jackson | 134/30 |

Primary Examiner—Ronald B. Cox

[57] ABSTRACT

The subject invention constitutes an uncomplicated, inexpensive means of loosening "frozen" cylinders under certain conditions in an internal combustion engine, by applying pressure to the piston by forcing grease from a grease gun applied to a fitting in the engine spark plug or injector hole.

1 Claim, 3 Drawing Figures

DEVICE AND METHOD FOR FREEING FROZEN ENGINE CYLINDERS

DESCRIPTION OF INVENTION AND CLAIMS

Figure 1:
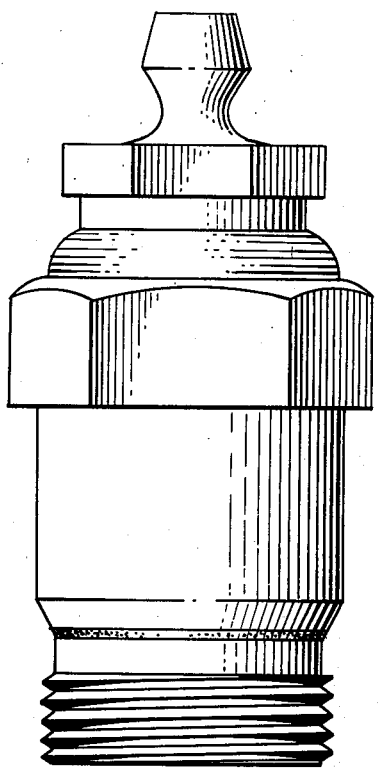
FIG. 1 shows a side view of the device.
Figure 2:
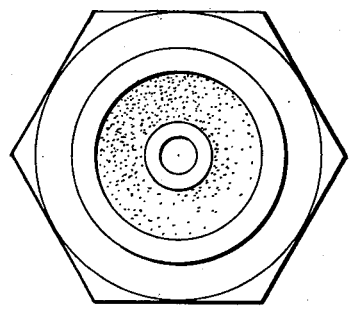
FIG. 2 shows a bottom view of the device.
Figure 3:
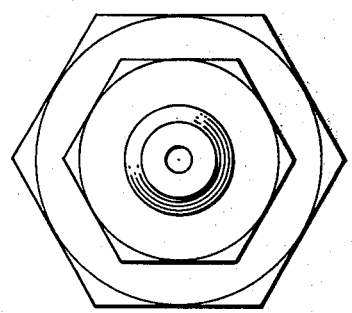
FIG. 3 shows a top view of the device.

The device invented by the petitioner is a simple one-piece device made of durable steel measuring in length about 1¾ inches overall. Its purpose is to facilitate the introduction of lubricants under pressure into a combustion chamber of an internal combustion engine to free a cylinder immobilized by corrosion. The device would be useful only in cases where the corrosion has not physically damaged or changed the internal engine configuration in any way. This device closely resembles a conventional automotive spark plug minus the porcelain-sheathed electrode, but including on top a conventional grease fitting. Its design would allow it to be screwed or inserted into an engine block or head with a conventional wrench. To use the the spark plug or injector must be removed and replaced by the device, which must be fitted into the block in the same manner a replacement plug or injector would be inserted. Before inserting the device, a few ounces of penetrating oil must be poured into the combustion chamber to loosen the rust. Then, heavy (SAE 80 to 90 transmission or gear type) oil must be added to fill the combustion chamber up to the spark plug or injector hole. Before any oil is added, however, the intake valve for the seized cylinder must be seated tightly. With the device inserted in the spark plug or injector hole, a conventional hand or air pressure grease gun is adjusted to the fitting on top of the device. Then, grease under normal grease-gun pressure is added to the oil in the now sealed combustion chamber in an effort to force-saturate with lubricant all corrosion-affected metal to the point where the immobile piston will be freed. The pressure may also expand the cylinder wall to facilitate breaking the corrosion bond and allowing piston travel once again.

Similarly affected cylinders must be treated in like manner, one at a time, by moving the device from one combustion chamber to another, making sure each time that the intake valve is closed tightly.

The petitioner is fully aware that the cannot be effective in cases where corrosion-caused seizure is so severe that only major-scale engine disassembly and part replacement may be the only possible corrective action.

I claim:

1. A device for freeing frozen pistons in the cylinders of an internal combustion engine comprising a fitting being adapted at one end to be placed in an existing engine spark plug or injector hole, said fitting at its other end being adapted as a grease gun lubrication fitting and further having a passage from the lubrication fitting at the one end to the other end and opening into the combustion chamber of said engine when the device is fitted into the spark plug or injector hole; whereby grease under pressure may be applied to the cylinder of a frozen piston in order to free the said piston.

* * * * *